Nov. 18, 1924.
E. R. BURTNETT
INTERNAL COMBUSTION ENGINE
Filed March 19, 1924    3 Sheets-Sheet 1
1,515,926
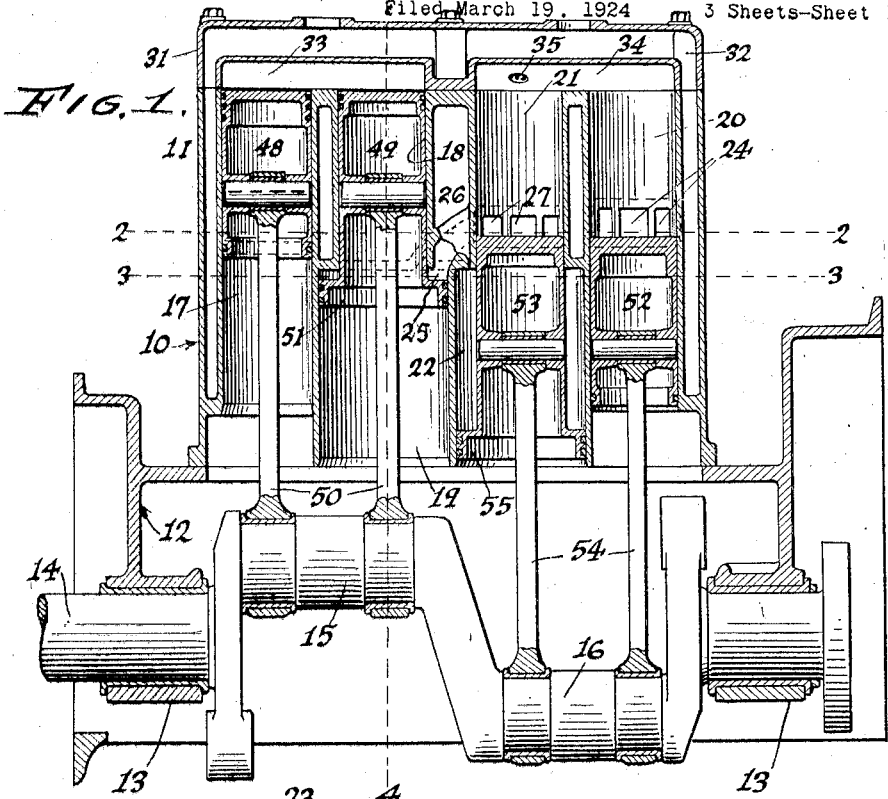
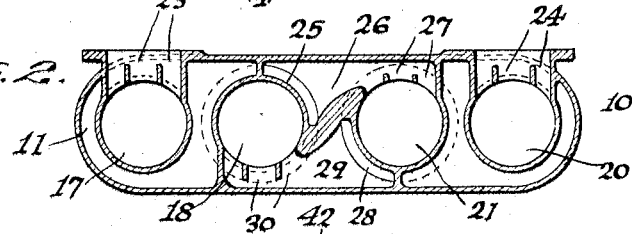
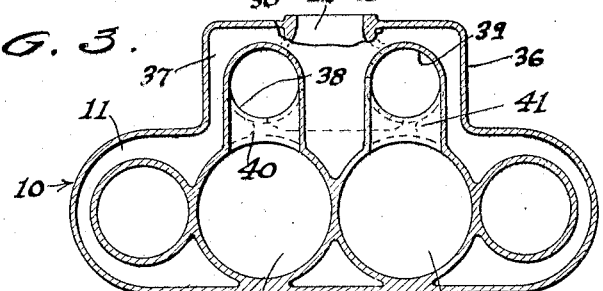
INVENTOR,
E. R. Burtnett,
By Martin P. Smith, Atty.

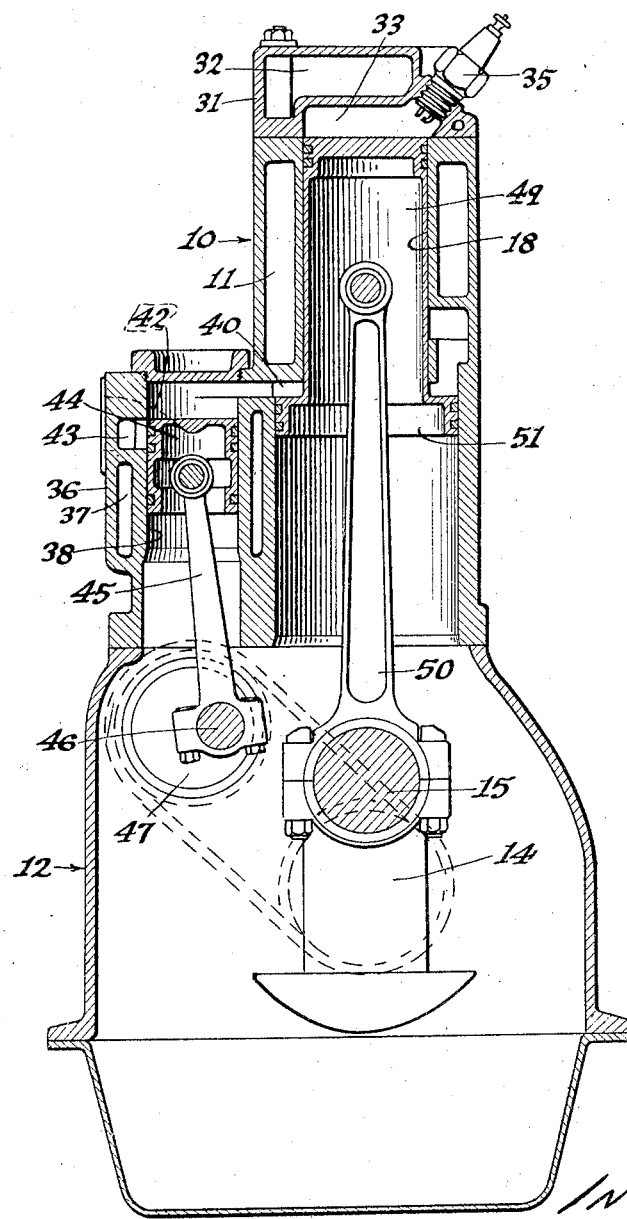

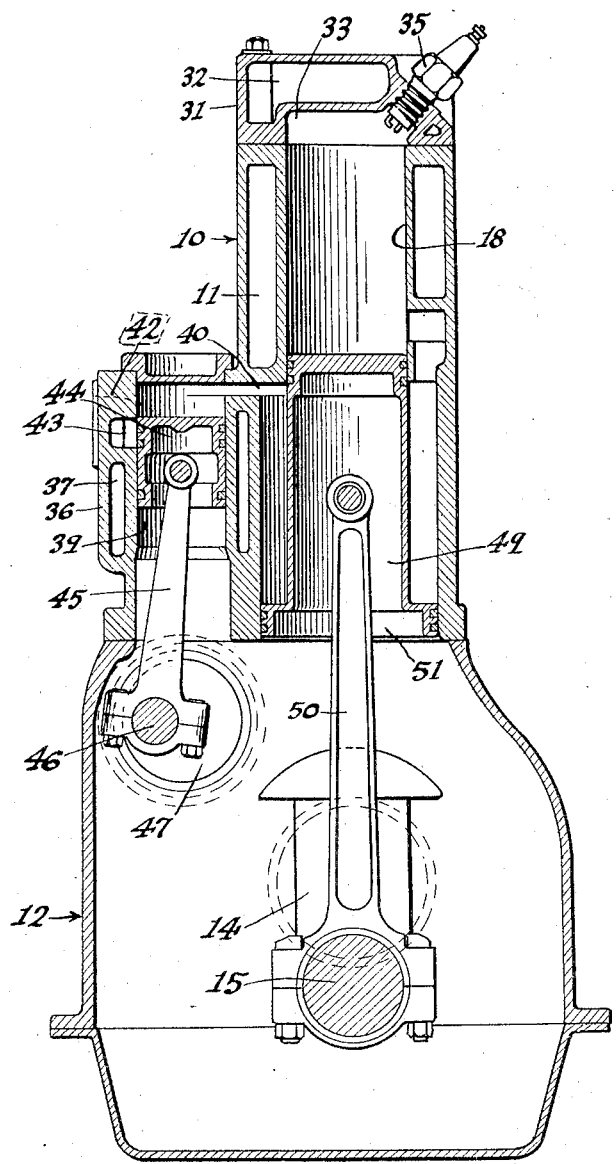

Patented Nov. 18, 1924.

1,515,926

UNITED STATES PATENT OFFICE.

EVERETT R. BURTNETT, OF LOS ANGELES, CALIFORNIA, ASSIGNOR OF ONE-HALF TO CHARLES A. BURTNETT, OF LOS ANGELES, CALIFORNIA.

INTERNAL-COMBUSTION ENGINE.

Application filed March 19, 1924. Serial No. 700,420.

*To all whom it may concern:*

Be it known that I, EVERETT R. BURTNETT, a citizen of the United States, residing at Los Angeles, in the county of Los Angeles and State of California, have invented certain new and useful Improvements in Internal-Combustion Engines, of which the following is a specification.

My invention relates to an internal combustion engine of the two stroke cycle type, the principal objects of my invention being to generally improve upon and simplify the construction of the existing forms of similar engines; to provide a two stroke cycle engine in which the precompression of the gaseous fuel mixture is accomplished through the use of a two diameter piston, thereby causing the gaseous fuel mixture to flow around the piston and be preheated to the extent of the temperature conditions of the piston; to provide a two stroke cycle engine having four cylinders combined and arranged so as to form two combustion units and having a positive piston precompression chamber and with a relatively small or limited endwise, over-all displacement; and, further, to provide a two combustion unit two stroke cycle engine having four pistons, the same being divided into two reciprocating elements, inasmuch as one of each of the pairs of two pistons is of the two-diameter construction.

Since it is desirable in the operation of an engine to equalize the weight of the reciprocating elements for the purpose of minimizing and eliminating vibration, I have arranged one straight combustion cylinder piston and one two-diameter combined combustion and precompression piston, together with direct connecting means, between each of the said pistons and one of the throws of the crank shaft.

A further object of my invention is to provide positively acting and silent valve means for effecting the constant inlet function duration of gaseous fuel mixture supply to the precompression chambers, in order to bring about engine operation at more uniform fuel induction vacuum and higher volumetric efficiency in charging at high speeds.

A further object of my invention is to provide transfer passages from the precompression chamber, as provided for by the second diameter of one of the combustion cylinders forming one of the dual cylinder combustion cylinder units, to one of the combustion cylinders forming the second dual combustion cylinder unit, in order to effect the transfer of precompressed gaseous fuel by a very simple and relatively short duct in the cylinder block casting, and, further, to locate the ignition means in the cylinder head and on the side of the combustion cylinder of the unit of two cylinders into which the gaseous fuel mixture is inducted and the transfer passage from the precompression chamber of one unit extending to the side of the immediately adjacent center cylinder and the second precompression chamber transfer passage extending to the opposite side of the adjacent center cylinder.

With the foregoing and other objects in view, my invention consists in the features of construction and combination and arrangement of parts hereinafter more fully described and claimed, reference being had to the accompanying drawings, in which—

Figure 1 is a vertical section taken lengthwise through the center of an engine of my improved construction, and coincident with the axes of the cylinders and the crank shaft;

Figure 2 is a horizontal section taken approximately on the line 2—2 of Figure 1;

Figure 3 is a horizontal section taken approximately on the line 3—3 of Figure 1;

Figure 4 is an enlarged cross section taken approximately on the line 4—4 of Figure 1 and showing the two diameter piston at the upper or inner end of its stroke;

Figure 5 is a vertical section similar to Figure 4, showing the two-diameter piston at the lower or outer end of its stroke.

Referring by numerals to the accompanying drawings, which illustrate a practical embodiment of my invention, 10 designates a cylinder block, preferably of the type having cells or chambers 11 formed in its walls for the circulation of a suitable cooling medium, said block surmounting a suitably formed crank case 12 in the end portions of which are formed bearings 13 for a crank shaft 14, the latter having two diametrically opposite cranks or throws 15 and 16. Formed in the block 10 above crank 15 are combustion chambers 17 and 18, the axes of which are preferably parallel and the lower portion of chamber 18 is enlarged diametrically so as to provide a gaseous fuel pumping chamber 19. Formed in block 10 above crank 16 are combustion chambers 20 and 21, the axes of which are preferably parallel and in the same plane with the axes of chambers 17 and 18, and the lower portion of chamber 21 is enlarged or increased in diameter to form a gaseous fuel pumping chamber 22. The arrangement of the four chambers just described is such that chambers 17 and 20 are located at the ends of the block while the two diameter chambers are arranged between said chambers 17 and 20.

Formed through the wall of block 10 and leading from chamber 17 is a series of exhaust ports 23 that are uncovered only when the piston in this chamber is at the lower or outer end of its travel, and similar exhaust ports 24 are located in the wall surrounding chamber 20 in a plane where they will be wholly uncovered only when the piston in said chamber is at the lower or outer end of its stroke.

Formed through the wall that serves as a shoulder between chambers 18 and 19 is an arcuate port 25 that communicates with the lower end of an inclined duct 26, the upper end of the latter communicating directly with a series of inlet ports 27 that are formed through the wall of chamber 21 and which latter ports occupy a plane where they will be wholly uncovered only, when the piston that operates within said chamber is at the lower or outer end of its stroke.

Formed through the wall that serves as a shoulder between chambers 21 and 22 is an arcuate port 28 that communicates with the lower end of an inclined duct 29, the upper end of the latter communicating directly with a series of ports 30 that are formed through the wall of chamber 18 in a plane where they will be wholly uncovered only when the piston that operates within said chamber is at the lower or outer end of its stroke.

The ducts 26 and 29 and ports at the ends thereof serve as transfer passageways whereby gaseous fuel compressed in chamber 19 is conducted into combustion chamber 21 and whereby gaseous fuel that is compressed in chamber 22 is conducted into combustion chamber 18. Secured in position on top of the cylinder block is a head 31 having a chamber or chambers 32 through which a fluid-cooling medium may be circulated and formed in the under side of this head block is a recess 33 that serves as a common clearance and compression chamber for the chambers 17 and 18. A similar recess 34 is formed in the under side of the head 31 and serves as a common clearance and compression chamber for the chambers 20 and 21. Seated in head 31 on opposite sides thereof and above the ports 27 and 31 are spark plugs 35, and the inner ends of the electrodes thereof project, respectively, into the common clearance chambers 33 and 34.

Formed on the lower portion of one side of block 10 and directly opposite the pumping chambers 19 and 22 is a piston valve housing 36 having a chamber 37 that communicates with the cooling fluid circulation chamber 11 and formed in said housing 36 are vertically disposed piston valve chambers 38 and 39, the same being located in line, respectively, with chambers 19 and 22. The upper end of piston valve chamber 38 is connected by a short passageway 40 with the upper portion of pumping chamber 19 and by a similar passageway 41, the upper portion of valve chamber 39 is connected to the upper portion of pumping chamber 22.

Formed in the rear portion of valve housing 36 is a short gaseous fuel inlet passageway 42 that may be connected to a suitable source of gaseous fuel supply, for instance, a carbureter, and this passageway communicates by means of short lateral branches 43 with the upper portion of the valve chambers 38 and 39. Arranged for reciprocatory movement within the valve chambers 38 and 39 are piston valves, such as 44, the same being connected, respectively, by ordinary connecting rods 45 to oppositely disposed cranks 46 of a piston valve actuating crank shaft 47. This crank shaft is driven directly from crank shaft 14 and at the same speed as the latter by suitable driving means, for instance, a chain operating on sprocket wheels or by intermeshing gears between the two shafts.

The cranks 46 of shaft 47 are arranged so that the piston valves 44 are drawn downward to open the gaseous fuel inlet ports 43 during the time that the pistons in the adjacent pumping chambers 19 and 22 are traveling downward on their induction or suction strokes. Arranged for reciprocatory movement within chambers 17 and 18 are pistons 48 and 49, respectively, and these pistons are connected by suitable connecting rods 50 to crank 15. Piston 49 has at its lower end an enlarged portion 51 that is arranged for operation and which serves as a pumping piston within chamber 19. Arranged for reciprocatory movement within chambers 20 and 21 are, respectively, pistons 52 and 53, the same being connected by suitable connecting rods 54 to crank 16. The lower portion of piston 53 is enlarged to provide a skirt portion 55 that operates as a gaseous fuel pumping piston within chamber 22.

The operation of my improved engine is as follows: Due to the arrangement of cranks 15 and 16, pistons 48 and 49, following combustion of compressed gaseous fuel in common clearance chamber 33, move downward as pistons 52 and 53 move upward, and vice versa. As piston 49 moves downward on its power stroke, the piston valve 44 that is directly behind or in line with chamber 19 is drawn downward a sufficient distance to admit gaseous fuel into inlet passageway 42, which gaseous fuel passes through the corresponding branch duct 43 to valve chamber 38, and thence through passageway 40 to chamber 19 above the skirt piston 51, which latter is moving downward so as to draw by suction a charge of gaseous fuel into that portion of chamber 19 above said skirt piston. During this induction of gaseous fuel into the pumping chamber 19, pistons 52 and 53 are moving upward to compress a gaseous fuel charge in the common clearance chamber 34, which gaseous fuel charge was previously admitted to chambers 20 and 21 through inlet ports 27 at the time the same were open. As pistons 52 and 53 approach and pass high center, the gaseous fuel charge compressed within chamber 34 is ignited as a result of a spark produced between the terminals of the electrodes of the corresponding plug 35 and the expansion following the combustion drives said pistons 52 and 53 downward on their power stroke.

As said pistons travel downward, pistons 48 and 49 are moving upward or inward, and during such stroke the charge of gaseous fuel drawn into pumping chamber 19 will be compressed in the upper portion thereof and within the passageway 26 that leads therefrom to the combustion chamber 21, but this compressed charge of gaseous fuel is not admitted to chamber 21 until piston 53 has traveled downward to a point where inlet ports 27 are uncovered. As soon as these inlet ports 27 are uncovered and begin to open, the compressed charge of gaseous fuel rushes through said ports into chamber 21, thence through common clearance chamber 34 and thence downward through chamber 20, driving before it the products of combustion that remain in the chambers 20 and 21, as a result of the combustion of the previously admitted gaseous fuel charge, and said products of combustion pass out through exhaust ports 24.

During the upward travel of the pumping piston 51, the piston valve 44 in chamber 38 has moved upward a sufficient distance to close the gaseous fuel inlet port leading thereto, and said inlet port is not opened until piston 51 starts downward again upon its suction or induction stroke. As pistons 52 and 53 start upward or inward on their compression stroke, inlet ports 24 and 27 are closed and the gaseous fuel charge admitted to the chambers 20 and 21 will be compressed therein and in common clearance chamber 34 until at the point of highest compression or when said pistons pass high center the compressed gaseous fuel charge is ignited as hereinbefore described, and said pistons will be driven downward on their power stroke.

Owing to the cross-over arrangement of the passageways 26 and 29, and the diametrically opposed arrangement of cranks 15 and 16, the skirt piston 55 on the lower end of piston 53 is effective in precompressing and pumping gaseous fuel into the combustion chamber 18 that is connected to combustion chamber 17 by the common clearance chamber 33. Piston valve actuating shaft 46 operates at the same speed as crank shaft 14 and by the relative arrangement of the cranks 46 said piston valves operate in proper time relation to the movements of the two-diameter pistons of the engine, and, as a result, gaseous fuel is admitted alternately to the piston valve chambers 38 and 39.

Inasmuch as the two main reciprocating masses of my improved engine (each mass including a single diameter piston and a two diameter piston and their connecting rods) are arranged to move simultaneously in opposition to each other, vibration while the engine is in operation is minimized, and the much desired and advantageous smooth running result is attained.

Inasmuch as the piston valve housings are located immediately adjacent to the pumping chambers, the gaseous fuel has a relatively short distance to travel from said valve cylinders to the pumping chambers, and during such short travel the gases pass over portions of the walls that surround certain of the combustion chambers, and as a result the gaseous fuel absorbs a certain amount of heat, thereby preheating said gaseous fuel before it enters the pumping cylinders. This preheating action is further enhanced due to the arrangement of the transfer ducts 26 and 29, which are immediately adjacent to the lower portions of the combustion chambers 18 and 21.

An internal combustion engine of my improved construction is comparatively simple, may be easily and cheaply produced, is very compact, is provided with positively acting piston valves, thereby insuring ample fuel supply at all engine speeds, and said engine, while primarily designed for the propulsion of motor vehicles, may be advantageously used for all rotary power producing purposes.

Obviously, the construction of the engine as herein shown and described may be varied in minor details without departing from the spirit of my invention, the scope of which is set forth in the appended claims.

I claim as my invention:

1. The combination, in a two stroke cycle internal combustion engine, of four cylinders, a piston arranged for operation within each cylinder, a two-throw crank shaft, each piston being separately connected to said crank shaft, a cylinder head having formed in its under side a pair of separate chambers, each chamber enclosing the head ends of a pair of cylinders so as to provide a common compression and combustion chamber to the two cylinders, ignition means located in each chamber in the head, said ignition means being arranged on opposite sides of the two combustion chambers, the two center cylinders each having a two-diameter bore, the pistons that operate within said center cylinders each having a two-diameter periphery, that portion of each center cylinder having the larger diameter constituting an annular gaseous mixture precompression chamber, a transfer duct leading from the precompression chamber of one center cylinder to ports formed in the chamber of smaller diameter of the adjacent cylinder and on one side thereof in relation to the row of four cylinders, a transfer duct leading from the annular precompression chamber of the other of the two center cylinders to ports formed in the wall of the smaller chamber of the other of the two center cylinders, said last mentioned ports being arranged on the opposite side of the cylinder from the ports in the other of the two center cylinders, and the said ignition means that is seated in the cylinder head being located on the same sides of the cylinders as are the inlet ports from said transfer ducts.

2. The combination, in a two stroke cycle internal combustion engine, of four cylinders, a piston arranged for operation within each cylinder, a two-throw crank shaft, each piston being separately connected to said crank shaft, a cylinder head having formed in its under side a pair of separate chambers, each chamber enclosing the head ends of a pair of cylinders so as to provide a common compression and combustion chamber to the two cylinders, ignition means located in each chamber in the head, said ignition means being arranged on opposite sides of the two combustion chambers, the two center cylinders each having a two-diameter bore, the pistons that operate within said center cylinders each having a two-diameter periphery, that portion of each center cylinder having the larger diameter constituting an annular gaseous mixture precompression chamber, a transfer duct leading from the precompression chamber of one center cylinder to ports formed in the chamber of smaller diameter of the adjacent cylinder and on one side thereof in relation to the row of four cylinders, a transfer duct leading from the annular precompression chamber of the other of the two center cylinders to ports formed in the wall of the smaller chamber of the other of the two center cylinders, said last mentioned ports being arranged on the opposite side of the cylinder from the ports in the other of the two center cylinders, the said ignition means that is seated in the cylinder head being located on the same sides of the cylinders as are the inlet ports from said transfer ducts, and exhaust ports formed in the walls of the two end cylinders and on the same side thereof.

3. In a two stroke cycle internal combustion engine, four cylinders arranged in a row, the two outer cylinders of the row having chambers of uniform diameter, the two center cylinders having two-diameter chambers, the head end of the chamber of each outer cylinder being connected to the head end of the adjacent two-diameter chamber by a common clearance, compression and combustion chamber, pistons arranged for operation within the chambers of the four cylinders, the pistons of the two center cylinders having two diameters for operation within the said two-diameter chambers, a transfer duct leading from the upper portion of the chamber of larger diameter of each two-diameter cylinder to the lower portion of the smaller chamber of the other two-diameter cylinder, the end cylinders of the row being provided with exhaust ports and valve controlled ports for controlling the admission of gaseous fuel into the larger diameter chambers of the two center cylinders.

4. In a two stroke cycle internal combustion engine, four cylinders arranged in a row, the two outer cylinders of the row having chambers of uniform diameter, the two center cylinders having two-diameter chambers, the head end of the chamber of each outer cylinder being connected to the head end of the adjacent two-diameter chamber by a common clearance, compression and combustion chamber, pistons arranged for operation within the chambers of the four cylinders, the pistons of the two center cylinders having two diameters for operation within the said two-diameter chambers, a transfer duct leading from the upper portion of the chamber of larger diameter of each two-diameter cylinder to the lower portion of the smaller chamber of the other two-diameter cylinder, the end cylinders of the row being provided with exhaust ports and valve controlled ports for controlling the admission of gaseoeus fuel into the larger diameter chambers of the two center cylinders, a two-throw crank shaft, connections from the piston in one of the end cylinders and the adjacent two-diameter piston to one of the throws of said crank shaft, and connections from the piston in the other end cylinder and the adjacent two-diameter piston to the other throw of said crank shaft.

5. In a two stroke cycle internal combustion engine, two pairs of combustion chambers, the lower portion of one chamber of each pair being of increased diameter to form a gaseous fuel compression chamber, pistons arranged for operation within said combustion chambers, one piston of each pair having a portion of larger diameter that operates within the gaseous fuel pre-compression chamber of increased diameter, the head ends of the members of each pair of combustion cylinders being connected by a common clearance, compression and combustion chamber, a two-throw crank shaft, separate connections from the pistons in one pair of chambers to one throw of said crank shaft, and separate connections from the pistons in the other pair of combustion chambers to the other throw of said crank shaft.

6. In a two stroke cycle internal combustion engine, two pairs of combustion chambers, the lower portion of one chamber of each pair being of increased diameter to form a gaseous fuel compression chamber, pistons arranged for operation within said combustion chambers, one piston of each pair having a portion of larger diameter that operates within the gaseous fuel pre-compression chamber of increased diameter, the head ends of the members of each pair of combustion cylinders being connected by a common clearance, compression and combustion chamber, a two-throw crank shaft, separate connections from the pistons in one pair of chambers to one throw of said crank shaft, separate connections from the pistons in the other pair of combustion chambers to the other throw of said crank shaft, valve controlled ports leading to the upper portions of the gaseous fuel compression chambers, a transfer duct leading from the upper portion of each gaseous fuel compression chamber to the combustion chamber of the two-diameter chamber that forms a member of the other pair of chambers, and the chamber of each pair having a uniform diameter being provided with exhaust ports.

7. In a two stroke cycle internal combustion engine, a pair of combustion chambers, one of which is of uniform diameter and the other one having a portion of increased diameter to form a gaseous fuel compression chamber, pistons arranged within said combustion chambers, one of which pistons has a portion of increased diameter arranged within the gaseous fuel compression chamber, a crank shaft, separate connections from the two pistons to one of the cranks of said shaft, a valve controlled duct leading into the gaseous fuel compression chamber of increased diameter, the combustion chamber that has a portion of increased diameter to provide the fuel compression chamber having a gaseous fuel inlet port, the other combustion chamber having an exhaust port, a head closing said combustion chambers, which head is provided with a recess that forms a common clearance, compression and combustion chamber for the pair of combustion chambers, and ignition means seated in said head and projecting into the chamber therein at a point above said gaseous fuel inlet port.

In testimony whereof I affix my signature.

EVERETT R. BURTNETT.